April 10, 1951 F. B. SHEPARD 2,548,400
FLUID FILTERING APPARATUS
Filed Sept. 28, 1949 2 Sheets-Sheet 1
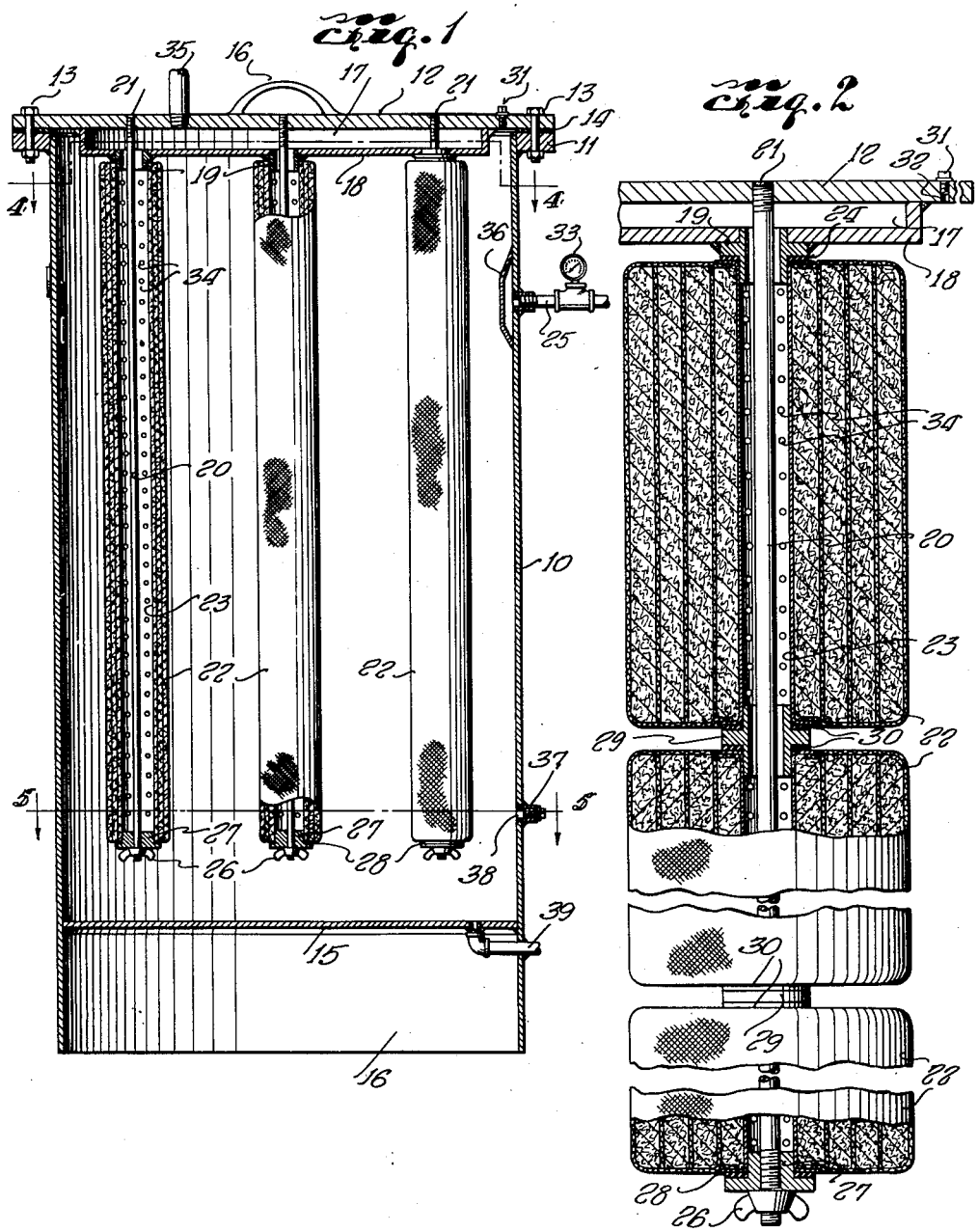
FRANK B. SHEPARD
INVENTOR.
ATTORNEY April 10, 1951  F. B. SHEPARD  2,548,400
FLUID FILTERING APPARATUS
Filed Sept. 28, 1949  2 Sheets-Sheet 2
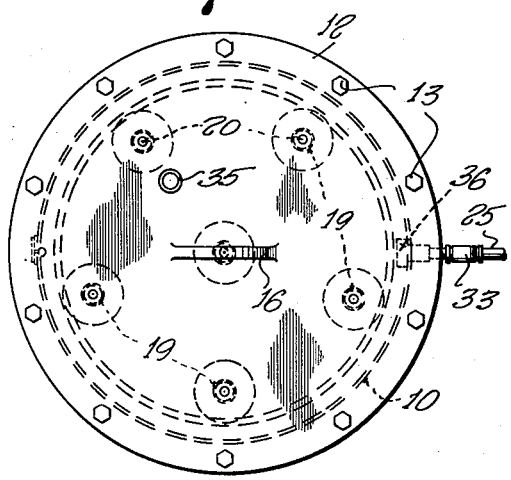
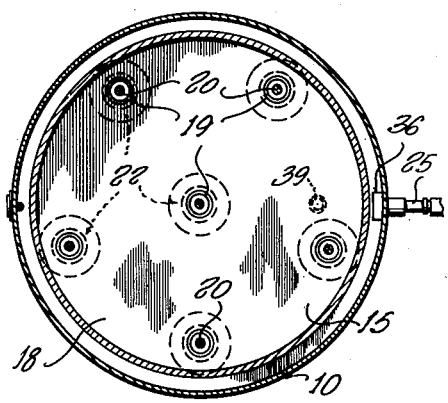
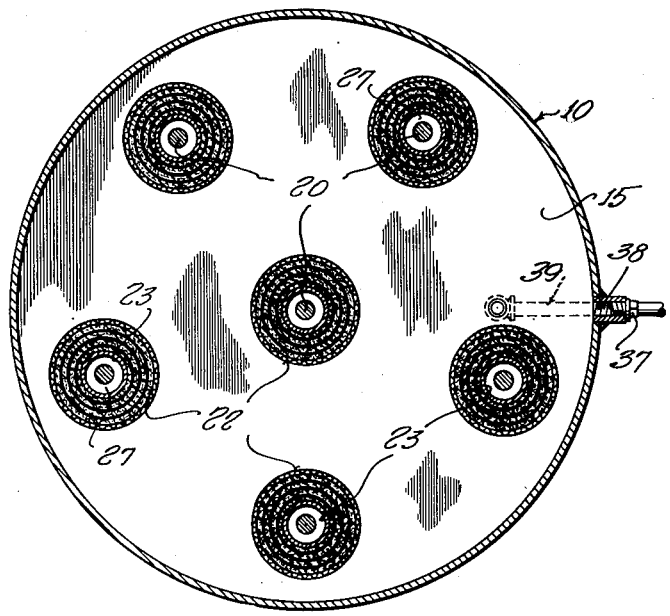
Frank B. Shepard
INVENTOR.
BY
ATTORNEY Patented Apr. 10, 1951

2,548,400

UNITED STATES PATENT OFFICE 2,548,400

FLUID FILTERING APPARATUS

Frank B. Shepard, Texon, Tex.

Application September 28, 1949, Serial No. 118,230

1 Claim. (Cl. 210—184)

This invention relates to liquid filtering apparatus and more particularly to a vessel containing filtering elements for purifying oils used as fuel or lubricant in the operation of engines or for like purposes.

The principal object of the invention is to supplant old filtering methods and apparatus which are not wholly effective to extract all foreign substances entrained in fuel or lubricating oils during passage thereof to or through an engine especially of the Diesel type. As a general rule, filtering elements of conventional apparatus are supported rather than suspended in a vessel and the manner of mounting these elements fails to prohibit access thereto of certain amounts of sludge precipitated out of the oil in circulation and therefore permits some of the foreign matter to be carried into the engine. The present invention obviates the possibility that any extraneous matter will be conveyed by the oil into the engine by suspending the filter elements in a novel manner well above the level reached by the foreign particles settled out of the oil in the vessel and these elements may be removed from the vessel for replacement without disturbing the sludge in the sump.

Another object of the invention is to provide a filtering apparatus for various kinds of fluids, comprising a closed vessel into which fluid is introduced under pressure and compelled by such pressure to penetrate the porous walls of a plurality of filtering elements suspended by rods from the removable top of the vessel and to pass through perforated cores in the filtering elements into a fluid chamber in the top of the vessel for egress therefrom to a predetermined point of disposal.

Still another object of the invention is to provide, in a vessel, a suspension means therein for filtering elements which is attached to and removable from the vessel with the cover thereof, thus to escape contact with the more contaminated fluid in the bottom of the vessel. Moreover, the suspension means, consisting of rods attached to and depending from the cover may be readily cleansed of adhering foreign substances and also, these rods may accommodate one or more filtering elements which latter may be impregnated, all or in part, with purifying agents known to have the quality to dispel or extract foreign matter from fluids or liquids circulated through the vessel, according to the nature of the fluids or liquids being processed.

Other objects will appear as the description proceeds, taken in connection with the accompanying drawing wherein:

Figure 1 is a view of the invention in vertical section.

Figure 2 is a fragmentary detail view, showing partly in vertical section an assembly of filtering elements and their suspension means.

Figure 3 is a top plan view of the invention.

Figure 4 is a transverse sectional view, taken on line 4—4 of Figure 1, and

Figure 5 is a transverse sectional view taken on line 5—5 of Figure 1.

Continuing with a more detailed description of the drawing, reference numeral 10 denotes generally a tank or vessel of any desired capacity, on which is provided an annular flange 11 about its top. A cover plate 12 is adapted to be secured in place by means of circumferentially spaced bolts 13, passing through aligned apertures in the flange 11 and adjacent the perimeter of the cover. A sealing gasket 14 is interposed between the flange and cover to preclude leakage of fluid from the vessel 10.

The bottom 15 of the vessel is spaced upwardly from its lower end to define an enclosure 16 (Fig. 1) to accommodate a suitable fluid pump, if in the adaptation of the apparatus such a pump may be required. The cover plate 12 has affixed thereto or formed thereon a bail 16 by which it may be readily lifted and conveyed from place to place.

Formed on the undersurface of the cover plate 12 is a chamber 17. This chamber is shown as being of circular form and defined by a flanged plate 18, secured as by welding, to the underside of the cover plate 12. Obviously, the chamber may be otherwise shaped and produced by casting the same as an integral part of the cover, if desired.

The plate 18 is provided with a plurality of spaced openings, in each of which is affixed by welding or otherwise, a nipple 19. A rod 20 extends axially through each nipple 19 with adequate clearance and its upper end is threaded into an opening in the cover plate 12 and a weld 21 is applied to close the opening, thus to permanently secure the rod in fixed relationship with the cover plate.

The rods 20 may extend to any desired depth in the vessel 10 and constitute suspension means for a plurality of filtering elements 22. The filtering elements 22 are of conventional manufacture and may be fabricated from different materials and compositions, depending upon the particular kind of fluid adapted to be filtered therethrough. In any case, the elements 22 are tubular, with porous walls, as shown; and each is provided with a perforated tubular core 23, adapted to embrace a rod 20. The upper end of the core frictionally receives the depending end of a nipple 19 and a gasket 24 (Fig. 2) is interposed between the upper end of the filter element 22 and the annular flange of the nipple 19 to prevent escape at this point of fluid rising into the chamber 17 from the tubular core of a filtering element. In fact, all fluid under pressure in the vessel 10 is required to enter the chamber 17 only after penetrating the filtering elements and this is accomplished by the pressure built up in the vessel through a fluid inlet pipe 25, to which further reference will be made presently.

The lower ends of the rods 20 are each threaded to receive a wing nut 26 which is adapted to engage a flanged sleeve 27, the latter entering the lower end of the core 23 of a filtering element and sustaining the same on the rod. A gasket 28 is interposed between the flange of the sleeve and the lower end of the element 22 to prevent leakage of fluid at this point.

The filtering elements 22 are made in different lengths. The suspension rods 20 of the invention are made in lengths to accommodate either the longest of the filtering elements or a number of the shorter elements in longitudinal alignment, as shown in Figure 2. In the latter case, a flanged coupling 29 is employed between the filtering elements to hold the cores 23 thereof in alignment. Gaskets 30 are arranged on each side of the flange of the coupling 29 for reasons previously explained.

The filtering apparatus of the invention has been designed primarily with a view towards cleaning the fuel and lubricating oils in the operation of Diesel engines but it is obvious that it may find other adaptations, even in filtering water for various uses. In the latter and kindred cases, the adaptation for suspending a plurality of filtering elements on each of a group of rods is advantageous in that one or more elements of each group may be impregnated with a purifying agent known to have a desirable effect on the liquid passed through the elements.

To operate the filter, fluid is forced into the vessel 10 through the inlet pipe 25 after removing a plug 31 from a venting orifice 32 in the cover plate 12 (Fig. 2) through which air is bled from the vessel as it is replaced by fluid. A pressure gauge 33 in the pipe 25 reveals the pressure in the vessel. When all of the air has been evacuated, the plug 31 is replaced in the vent orifice, whereupon fluid in the vessel will be forced through the porous walls of the filtering elements 22 into the tubular cores 23 thereof by way of the apertures 34 therein. The fluid will pass upwardly through the cores 23 into the chamber 17, from which it will pass through the outlet pipe 35 to the engine being operated or to another point for disposition, practically free of any extraneous matter.

At the point where the fluid enters the vessel from the inlet pipe 25, there is provided a baffle plate 36 (Figs. 1 and 4) which tends to direct the fluid laterally and thus prevent possible damage to the adjacent filtering element.

It is obvious from the foregoing that any foreign matter heavier than the fluid being filtered will settle in the sump below the lower extremities of the filtering elements while the lighter substances will collect on the outer surfaces of the elements after failing to penetrate the walls thereof.

When it has been determined that the filtering elements require to be replaced, a plug 37 is removed from a drain opening 38 in the wall of the vessel 10, spaced above the lower ends of the filtering elements and the contents of the vessel are drained off, leaving only the sludge in the bottom of the vessel below the drain 38. In this manner, practically all of the relatively clean liquid is saved, which is an advantage over some types of conventional filtering apparatus in which the residue liquid remaining in the tank is thown away.

It is also apparent that when the bolts 13 are removed and the cover plate 12 lifted, the filtering elements are collectively removed from the vessel at the top and will therefore not disturb the sludge left in the bottom of the vessel which is later drawn off through a separate drain 39.

Manifestly, the construction as shown and described is capable of some modification and such modification as may be construed to fall within the scope and meaning of the appended claim is also considered to be within the spirit and intent of the invention.

What is claimed is:

An oil filtering apparatus comprising, in combination, a closed vessel having an annular flange about its top having spaced apertures therein, a removable cover on said vessel having apertures aligned with those of said flange, bolts entering said apertures for securing said cover on said vessel, a fluid receiving chamber formed on the underside of said cover, a group of relatively spaced rods attached to and depending from said cover into said vessel through openings in said chamber, a nipple in each of said chamber openings defining an annular passage to embrace a rod of said group, a filtering element for each of said rods having a perforated tubular core whose upper end is engaged by and held in centered relation to a chamber opening by said nipple, said core communicating with said chamber by means of said annular passage, a flange sleeve on said rod and entering the bottom end of said perforated core for holding said filtering element against displacement on its respective rod, a restricted air venting orifice in said cover to release air replaced by oil in said vessel, an oil inlet in the wall of said vessel below the top thereof, a baffle disposed over said inlet for directing oil entering said vessel away from said filtering elements, means in said cover for releasing filtered oil entering said chamber through said filtering elements, and means for draining fluid from said vessel at a point spaced above the bottom thereof.

FRANK B. SHEPARD.

REFERENCES CITED

The following references are of record in the file of this patent:

UNITED STATES PATENTS

| Number | Name | Date |
|---|---|---|
| 582,400 | Stifel | May 11, 1897 |
| 779,013 | Wahnsiedler | Jan. 3, 1905 |
| 870,631 | Kneuper | Nov. 12, 1907 |
| 1,294,018 | Zahm | Feb. 11, 1919 |
| 2,161,679 | Kuenhold | June 6, 1939 |